United States Patent Office 2,859,458
Patented Nov. 11, 1958

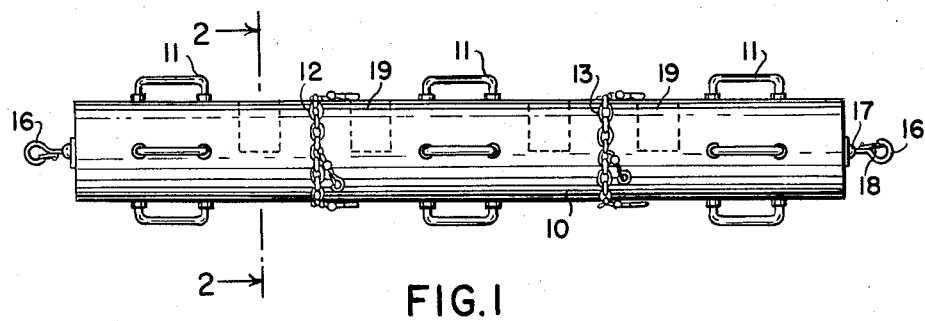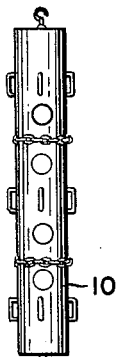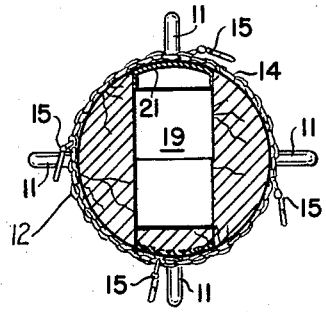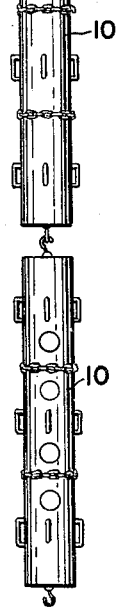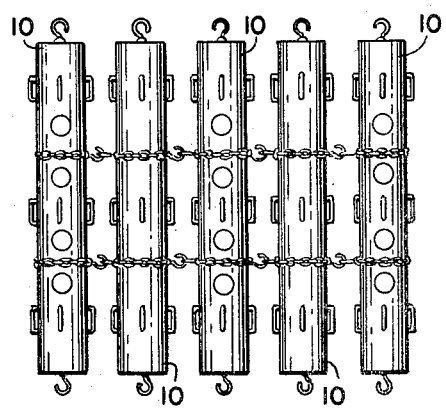

2,859,458
LIFE PRESERVING FLOAT

Carmine Leo Calarco, New York, N. Y.

Application May 2, 1956, Serial No. 582,184

1 Claim. (Cl. 9—11)

The present invention relates to life rafts and more particularly to life rafts that are especially adapted for air-sea rescue purposes.

When a ship or airplane is disabled at sea, search planes are dispatched to locate the disabled craft or the survivors for the purpose of dropping rafts and other disaster survival equipment to them. At the present time it is customary for the rescue plane to drop small boats, rubber life rafts and other life preserving equipment. Devices that are in common use at the present time present certain disadvantages in that rubber life rafts must be inflated and small boats that are dropped are susceptible to overturning while being dropped. It is to these and other disadvantages of the present equipment that this invention is directed.

Accordingly, a primary object of the present invention is to provide an improved life preserving float.

Another object of the present invention is to provide an improved life preserving float which can quickly and easily be linked to other similar floats while in the water to permit group saving.

Another object of the present invention is to provide a life preserving float that will conveniently support a large number of people in the water.

A further object of the present invention is to provide a life preserving float having compartments to store equipment and supplies which are readily accessible.

In accordance with the above objects, the life preserving float of the present invention takes the form preferably of a cylinder made of a buoyant material, such as balsa wood. A plurality of handles are strategically located on the cylinder so that survivors can readily hang on to the float. A hook device is secured at each end of the float so that a plurality of these floats may be joined together end-to-end in tandem fashion. In this way groups of survivors supported by different floats may join together to stay in a single group. In addition, other fastening devices are located around the periphery of each float so that a plurality of the floats may be joined side by side to form a raft assembly. Each float has an air tight compartment in which supplies such as food, signal flares, sea marker dye, etc., may be stored.

The invention will be more fully understood from the following detailed description of a specific preferred embodiment thereof, taken in conjunction with the accompanying drawings, in which:

Fig. 1 is a side view of a life preserving float of the present invention;

Fig. 2 is a section taken on the line 2—2 of Fig. 1;

Fig. 3 shows a series of floats hooked together in tandem; and

Fig. 4 shows a plurality of floats joined together to form a raft.

Referring now to the drawings and more particularly to Figures 1 and 2, the float of the present invention comprises a body member 10 which is of cylindrical shape and made of a buoyant material, such as balsa wood. At equally spaced points along the length of the float around the periphery thereof, there is a group of four handles 11. As shown in Fig. 1, there are three such groups, though, of course, it is understood that more handles may be provided depending upon the length of the float. In each group there are four handles which are aligned and spaced equally around the periphery of the float body 10, as more clearly shown in Fig. 2. Thus it is seen that no matter how the float may rotate in the water a plurality of handles will be in view and available to survivors. Each handle is preferably U-shaped and may be secured to the float body by any suitable means. A pair of link chains 12 and 13 encircle the float and are secured thereto a distance apart by staples 14. Each of the link chains has four spring hooks 15 linked thereto and equally spaced around the circumference of the float for purposes to be hereinafter more fully described.

In order to join a plurality of floats end to end, a hook 16 is provided at the center of each end of the float. Each hook 16 is secured to the float by a ball and socket 17 so that the hooks 16 will have freedom of movement. Each of these hooks is of the safety type in that they are provided with a leaf spring 18 to prevent disengagement. The float is provided with a plurality of hollowed out portions 19 within which supplies may be stored. Each hollowed out portion has a cover 21 which is received by a friction fit to provide an air and water tight compartment. The cover 21 may be made of a plastic material which can be readily removed to permit access to the supplies by persons or survivors hanging onto the float.

It is contemplated that a plurality of these floats would be carried by a search or rescue plane and that the floats would be dropped to survivors after they have been located. After the survivors have various floats dropped to them, they could quickly and conveniently hook them end-to-end as shown in Fig. 3 and in this way remain in one group. Alternatively, a plurality of these floats can be joined side-by-side as shown in Fig. 4. In this case the hooks 15 which are linked to the chains 12 and 13 would be linked together. In both the tandem and raft arrangement it is readily seen that a flexible rather than a rigid structure is provided. This is important in rough seas in that it permits the structure to more easily ride in with the waves. With the floats arranged as a raft some survivors may get on top of the structure while others can avail themselves of the handles to hang on.

Though the present invention has been described with reference to a specific embodiment thereof it is understood that this is not to be considered as limiting the invention as set forth in the appended claim.

I claim:

An elongated cylindrical body member of light, buoyant, balsa wood material as a unit to form a life preserving float, said body member having at least one compartment therein for supplies, and a sealing member for said compartment, a hook at each end of said body member whereby a plurality of floats may be joined end-to-end, ball and socket means securing each hook to the respective end of the body member whereby each hook has freedom of angular movement, a pair of link chains encircling the float body and spaced apart longitudinally thereof and intermediate the ends of the body member, a plurality of hooks joined to each link chain at equally spaced intervals thereof, a plurality of handles secured to said cylindrical body, said plurality of handles being disposed in at least three groups spaced longitudinally of said float, each group of handles comprising four handles equally spaced around the periphery of the float and a plurality of hollow water tight compartments in said float body.

(References on following page)

References Cited in the file of this patent

UNITED STATES PATENTS

| | | |
|---|---|---|
| 157,215 | Parker | Nov. 24, 1874 |
| 247,969 | Torras | Oct. 4, 1881 |
| 458,763 | Madden | Sept. 1, 1891 |
| 1,143,830 | Jorgensen | June 22, 1915 |
| 1,263,824 | Warminski | Apr. 23, 1918 |
| 1,727,902 | Reno | Sept. 10, 1929 |

FOREIGN PATENTS

| | | |
|---|---|---|
| 267,270 | Great Britain | Mar. 17, 1927 |